(12) United States Patent
Foslien et al.

(10) Patent No.: US 6,754,388 B1
(45) Date of Patent: Jun. 22, 2004

(54) CONTENT-BASED RETRIEVAL OF SERIES DATA

(75) Inventors: Wendy K. Foslien, Minneapolis, MN (US); Steven A. Harp, Coon Rapids, MN (US); Kamakshi Lakshminarayan, Minneapolis, MN (US); Dinkar A. Mylaraswamy, New Brighton, MN (US)

(73) Assignee: Honeywell Inc., Morristown, NJ (US)

(*) Notice: Subject to any disclaimer, the term of this patent is extended or adjusted under 35 U.S.C. 154(b) by 0 days.

(21) Appl. No.: 09/346,245

(22) Filed: Jul. 1, 1999

(51) Int. Cl.$^7$ .............................................. G06K 9/62
(52) U.S. Cl. ..................... 382/215; 382/209; 382/218
(58) Field of Search ............................ 382/159, 181, 382/189, 190, 195, 209, 215, 217, 218, 219, 225, 305; 345/700; 700/1, 3, 4, 5, 6, 7

(56) References Cited

U.S. PATENT DOCUMENTS

| | | | |
|---|---|---|---|
| 4,975,865 A | | 12/1990 | Carrette et al. ............... 700/10 |
| 5,353,355 A | * | 10/1994 | Takagi et al. ................ 382/111 |
| 5,787,425 A | | 7/1998 | Bigus ............................ 707/6 |
| 5,799,300 A | * | 8/1998 | Agrawal et al. ................ 707/5 |
| 5,799,301 A | | 8/1998 | Castelli et al. ................. 707/6 |
| 5,799,310 A | | 8/1998 | Anderson et al. ........... 707/102 |
| 5,809,499 A | | 9/1998 | Wong et al. .................... 707/6 |
| 5,832,182 A | | 11/1998 | Zhang et al. ................. 707/50 |
| 5,832,183 A | | 11/1998 | Shinohara et al. ............ 706/20 |
| 5,832,456 A | * | 11/1998 | Fox et al. ..................... 705/10 |
| 5,930,789 A | * | 7/1999 | Agrawal et al. ................ 707/6 |
| 5,940,825 A | | 8/1999 | Castelli et al. ................. 707/6 |
| 6,182,069 B1 | * | 1/2001 | Niblack et al. ................ 707/6 |
| 6,226,388 B1 | * | 5/2001 | Qian et al. ................... 382/103 |
| 6,275,229 B1 | * | 8/2001 | Weiner et al. ............... 345/764 |
| 6,308,172 B1 | * | 10/2001 | Agrawal et al. ............... 707/5 |

FOREIGN PATENT DOCUMENTS

EP      0742525 A     11/1996

OTHER PUBLICATIONS

Zaïane, et al (Discovering Web Access Patterns and Trends by Applying PLAP and Data Mining Technology on Web Logs*), IEEE, pp. 1–11, 1998.*
Faloutsos, et al. "A Fast algorithm for indexing, data–mining and visualization of traditional and multimedia datasets", IEEE, pp. 163–174, 1995.*
Faloutsos, et al. "Fast subsequence matching in time–series databases", IEEE, pp. 419–429, 1994.*
Patent Abstracts of Japan, vol. 1998, No. 14, Dec. 31, 1998 & JP 10 240716 A (NEC Corp). Sep. 11, 1998 Abstract.

* cited by examiner

*Primary Examiner*—Daniel Mariam
(74) *Attorney, Agent, or Firm*—Anthony Miologos; Schwegman Lundberg Woessner Kluth

(57) ABSTRACT

A graphical user interface (GUI) is used to quickly and easily find data patterns within a data sequence that match a target data pattern representing an event of interest. The user first specifies the target data pattern either by dragging a cursor over the target or by selecting the target from a palette of predefined trend patterns. Search criteria, such as a match threshold and amplitude and duration constraints, are then specified. A pattern recognition technique is then used to find data patterns within the data sequence that satisfy the search criteria. These matching data patterns are then presented to the user ranked by similarity, avoiding the need for the user to sift through large amounts of irrelevant data. Particular pattern recognition algorithms are also disclosed.

15 Claims, 13 Drawing Sheets

CONTENT-BASED RETRIEVAL OF SERIES DATA

FIELD OF THE INVENTION

The present invention relates to data series. More particularly, the present invention relates to retrieval of data contained in large sequences of data.

BACKGROUND

In many industries, large stores of data are used to track variables over relatively long expanses of time or space. For example, several environments, such as chemical plants, refineries, and building control, use records known as process histories to archive the activity of a large number of variables over time. Process histories typically track hundreds of variables and are essentially high-dimensional time series. The data contained in process histories is useful for a variety of purposes, including, for example, process model building, optimization, control system diagnosis, and incident (abnormal event) analysis.

Large data sequences are also used in other fields to archive the activity of variables over time or space. In the medical field, valuable insights can be gained by monitoring certain biological readings, such as pulse, blood pressure, and the like. Other fields include, for example, economics, meterology, and telemetry.

In these and other fields, events are characterized by data patterns within one or more of the variables, such as a sharp increase in temperature accompanied by a sharp increase in pressure. Thus, it is desirable to extract these data patterns from the data sequence as a whole. Data sequences have conventionally been analyzed using such techniques as database query languages. Such techniques allow a user to query a data sequence for data associated with process variables of particular interest, but fail to incorporate time-based features as query criteria adequately. Further, many data patterns are difficult to describe using conventional database query languages. Moreover, the lack of an intuitive interface impairs efficiency for many users.

In order to facilitate querying data sequences, so-called graphical query languages have been developed that offer a graphical user interface (GUI) to enter standard query language commands. Even using these graphical query languages, however, it is difficult to specify temporal feature sets or patterns that characterize events of interest.

Another obstacle to efficient analysis of data sequences is their volume. Because data sequences track many variables over relatively long periods of time, they are typically both wide and deep. As a result, the size of some data sequences is on the order of gigabytes. Further, most of the recorded data tends to be irrelevant. Due to these challenges, existing techniques for extracting data patterns from data sequences are both time consuming and tedious.

SUMMARY OF THE INVENTION

According to one aspect of the present invention, a graphical user interface (GUI) is used to quickly and easily find data patterns within a data sequence that match a target data pattern representing an event of interest. The user first uses the GUI to specify the target data pattern. Search criteria, such as a match threshold and amplitude and duration constraints, are then specified. A pattern recognition technique is then applied to the data sequence to find data patterns within the data sequence that satisfy the search criteria. Thus, the user avoids the need to sift through large amounts of data not relevant to the current query.

According to one embodiment, the present invention is directed to a method for finding, within a data sequence, matching data patterns that satisfy a similarity criterion with respect to a target data pattern. A graphical representation of at least a portion of the data sequence is displayed using a GUI. The GUI is then used to define the target data pattern within the data sequence and the similarity criterion. A pattern recognition algorithm is then applied to the data sequence to find the matching data patterns that satisfy the similarity criterion with respect to the target data pattern.

In another embodiment, a target data pattern within the data sequence and at least one search constraint are defined using a GUI. A pattern recognition algorithm is applied to the data sequence to find matching data patterns that satisfy the search constraint with respect to the target data pattern. These matching data patterns are then presented to the user.

Still another embodiment is directed to a method for finding, within a data sequence, matching data patterns that satisfy a similarity criterion with respect to a target data pattern. A graphical representation of at least a portion of the data sequence is displayed using a graphical user interface. The target data pattern within the data sequence and the similarity criterion are then defined using the graphical user interface. Next, a plurality of temporally warped versions of at least a portion of the target data pattern are prepared. At least one of these temporally warped versions is compared to at least a portion of the data sequence to determine a plurality of candidate data patterns within the data sequence that satisfy a match threshold with respect to the compared at least one temporally warped version. Candidate data patterns that violate amplitude limits are rejected.

Other embodiments are directed to computer-readable media and computer arrangements for performing these methods.

DETAILED DESCRIPTION

The present invention is applicable to collections of data known in the industry as data sequences. The invention has been found to be particularly advantageous for use in data sequences in which events of particular interest are represented by relatively short data sequences contained in large amounts of data. An appreciation of various aspects of the invention can be gained through a discussion of various application examples operating in such environments.

According to one example embodiment of the present invention, a data sequence is analyzed using visually-oriented pattern matching and feature analysis techniques. A graphical user interface (GUI) facilitates specifying events of interest that are to be found within the data sequence. The user uses the GUI to translate the quantitative information contained in the event into a description that is used by a search algorithm to find matches in the data sequence. The translation is performed by selecting a segment of data on a graph or by using a template that describes the data of interest as, for example, a decaying sinusoid.

After an event is specified, any of several pattern recognition techniques is used to search the data sequence for segments that are similar to the event. These matches are presented as a ranked listing to the user, who can examine the match results and select those that best fit his or her needs rather than scanning all of the data within the data sequence. Thus, the user can view interesting portions of the data sequence quickly and easily without visually sifting through a large amount of uninteresting data. Further, the user benefits from being able to specify the search criteria in a manner compatible with the nature of the data, as time-dependent plots or templates are a natural method to define time-dependent patterns of interest.

Figure 1:
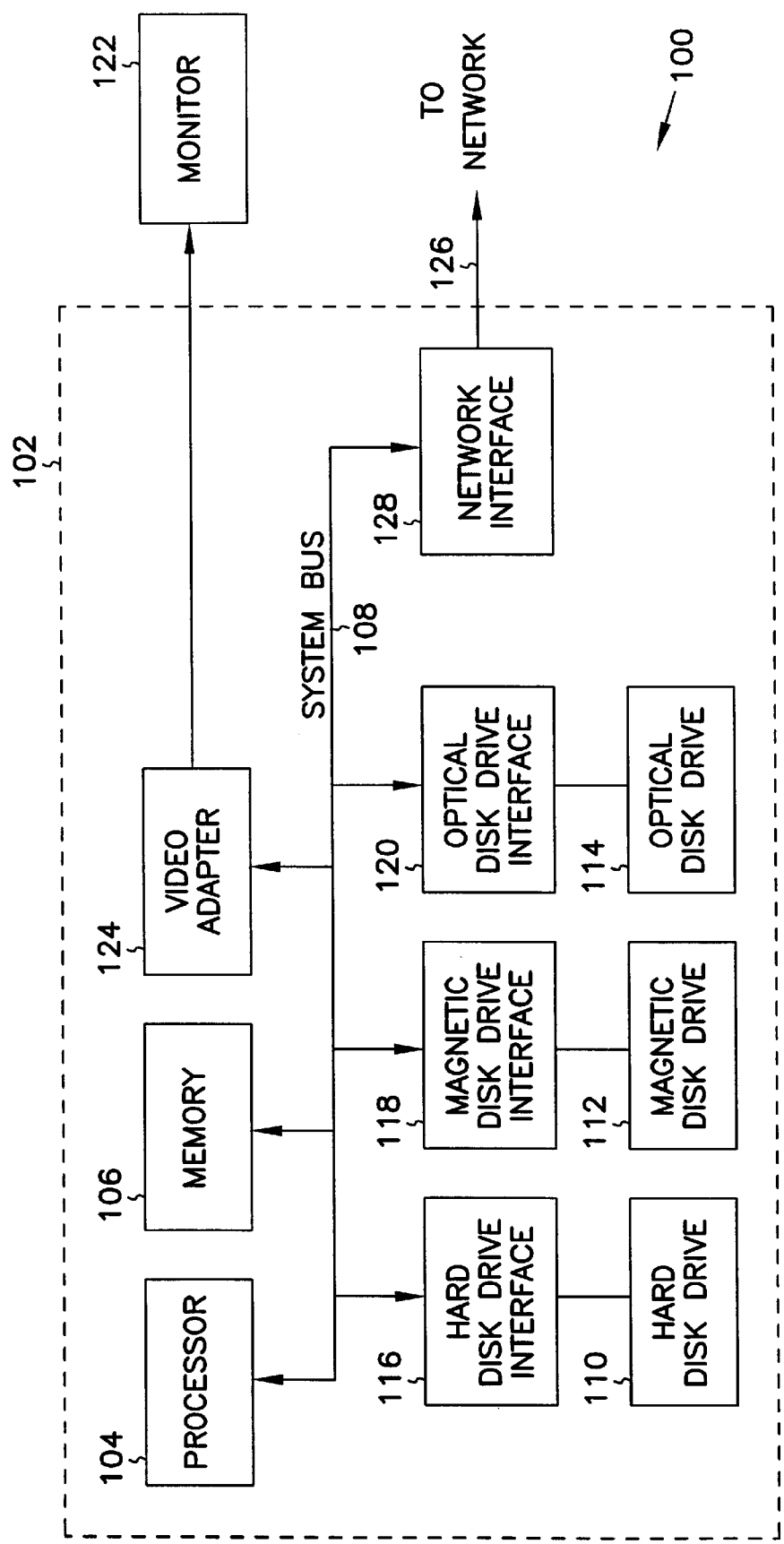
FIG. 1 is a system diagram of a computer arrangement for analyzing a process history, according to an example embodiment of the present invention.

Referring now to the drawings, FIG. 1 depicts an example computer arrangement 100 for analyzing a data sequence. This computer arrangement 100 includes a general purpose computing device, such as a computer 102. The computer 102 includes a processing unit 104, a memory 106, and a system bus 108 that operatively couples the various system components to the processing unit 104. One or more processing units 104 operate as either a single central processing unit (CPU) or a parallel processing environment.

The computer arrangement 100 further includes one or more data storage devices for storing and reading program and other data. Examples of such data storage devices include a hard disk drive 110 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium.

The hard disk drive 110, magnetic disk drive 112, and optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the computer arrangement 100. Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the present invention.

A number of program modules can be stored or encoded in a machine readable medium such as the hard disk, magnetic disk, optical disc, ROM, RAM, or an electrical signal such as an electronic data stream received through a communications channel. These program modules include an operating system, one or more application programs, other program modules, and program data.

A monitor 122 is connected to the system bus 108 through an adapter 124 or other interface. Additionally, the computer arrangement 100 can include other peripheral output devices (not shown), such as speakers and printers The computer arrangement 100 can operate in a networked environment using logical connections to one or more remote computers (not shown). These logical connections are implemented using a communication device coupled to or integral with the computer arrangement 100. The data sequence to be analyzed can reside on a remote computer in the networked environment. The remote computer can be another computer, a server, a router, a network PC, a client, or a peer device or other common network node. FIG. 1 depicts the logical connection as a network connection 126 interfacing with the computer arrangement 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
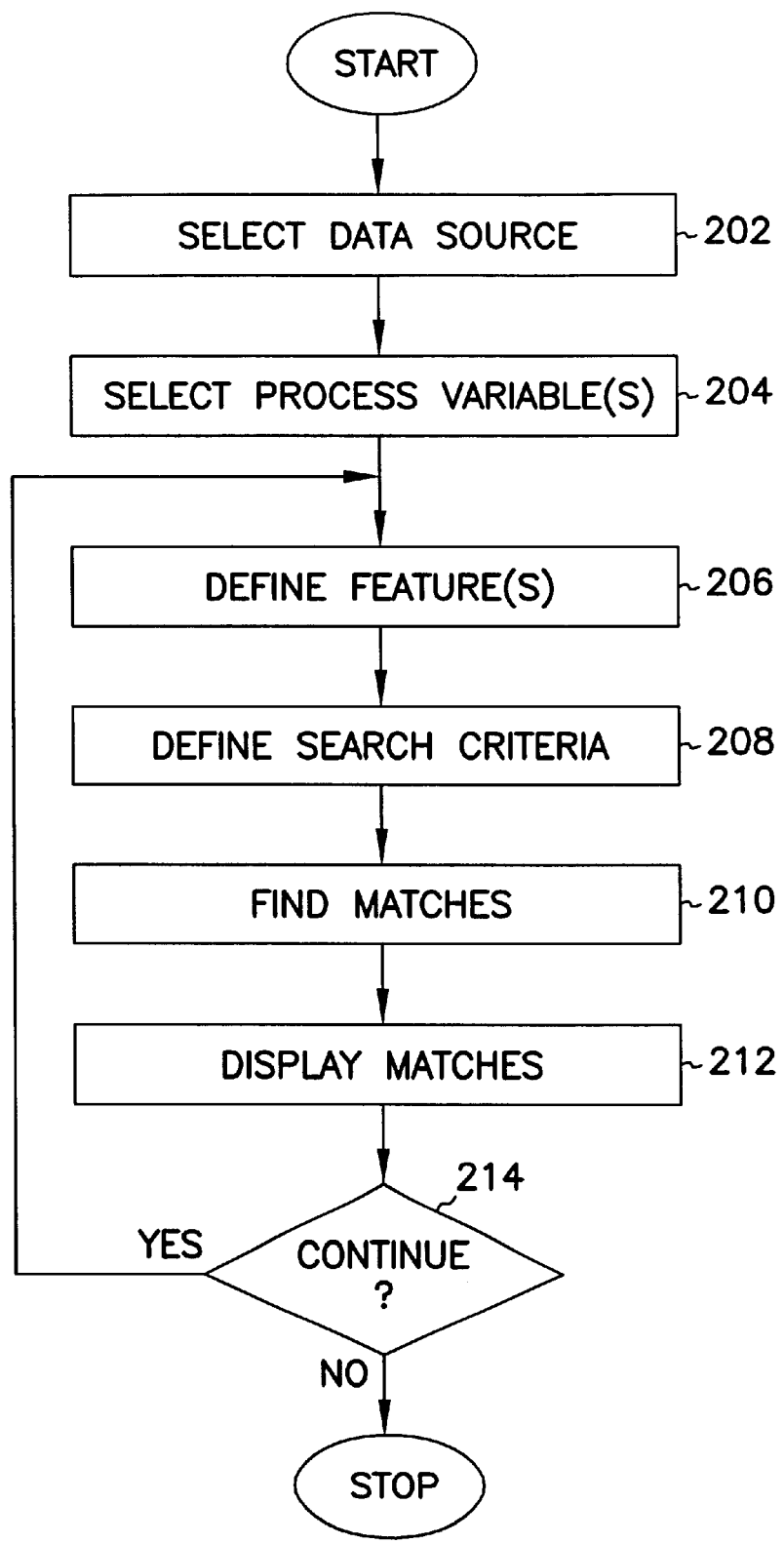
FIG. 2 is a flowchart of a method for analyzing a data sequence, according to another example embodiment of the present invention.

FIG. 2 depicts an example method 200 for searching a data sequence for an event of particular interest, according to an embodiment of the present invention. First, at a block 202, the user selects a data source, such as a data file, a history data base, or a CD-ROM. The data file can be stored in a standard file format, e.g., ASCII text, or in an application-specific format.

Figure 3:
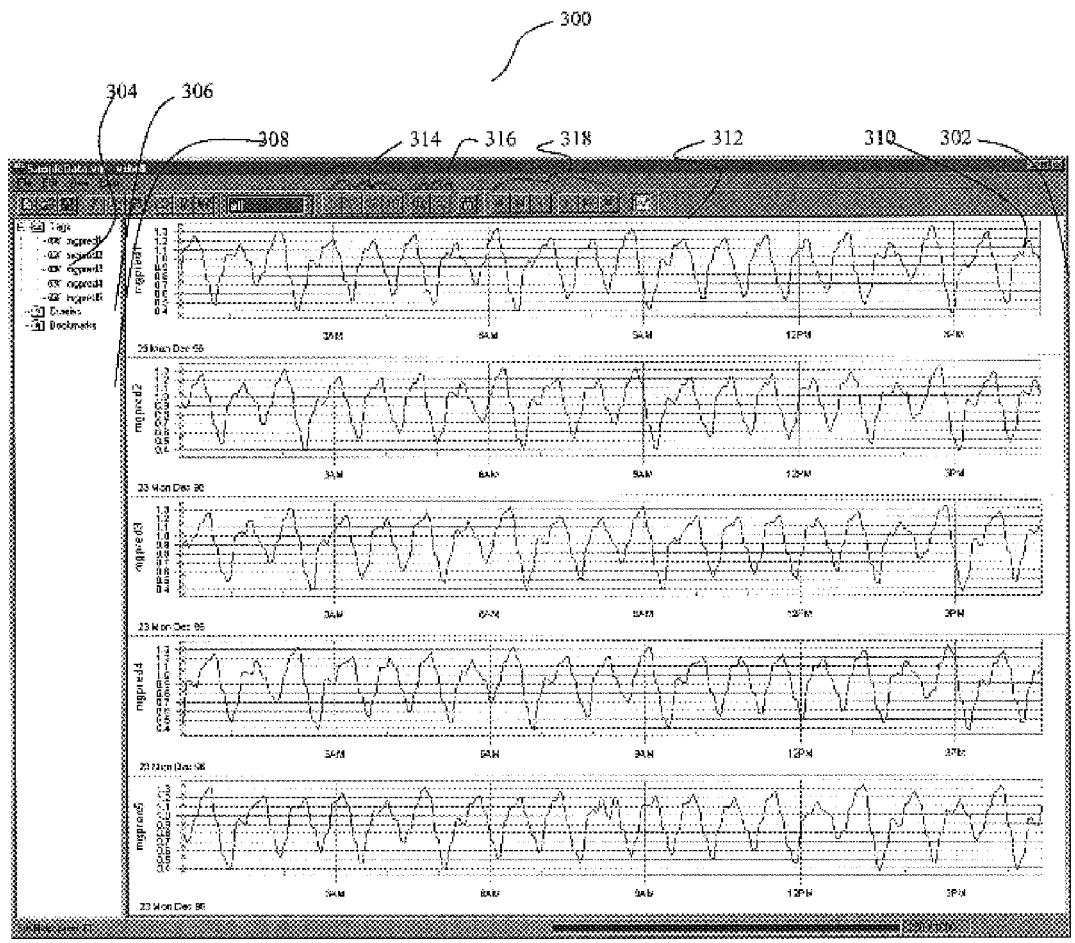
FIG. 3 illustrates the activity of five process variables of interest, according to a particular application example of an embodiment of the present invention.

Next, as depicted at a block 204, the user selects a process variable, which is then plotted as a function of time in a graph. It should be noted that the user can select more than one process variable for viewing. FIG. 3 illustrates a particular application example in which five process variables have been selected for viewing in a display area 302 of a GUI 300. When the user selects a process variable by right-clicking on it with the mouse, a dialog box appears that allows the user to view characteristics of the process variable, such as the file in which its data is stored, sampling period, number of samples, and duration for which the process variable was monitored.

The selected process variables are indicated as tags 304 in a hierarchical tree structure 306 displayed in a pane 308 of the GUI 300. In the display area 302, each selected process variable is diplayed using a graph 310. A toolbar 312 has scale controls 314 to allow rapid selection of time scales for viewing the selected process variables. Magnifier buttons 316 facilitate zooming in to and out of areas of interest. Additionally, scroll buttons 318 allow the user to scroll through the graphs 310 by page or grid. The user can also use the scroll buttons 318 to jump to the beginning or the end of the available data.

A scroll bar 320 indicates the portion of the data sequence that the user is viewing. For example, if the user is viewing the beginning of the data sequence, the scroll bar 320 will appear at the left side of the display area 302. By contrast, if the user is viewing the end of the data sequence, the scroll bar 320 will appear at the right side. In addition to discerning which portion of the data sequence the user is viewing, the user can also click on the scroll bar 320 to jump to a particular location within the data sequence.

Figure 13:
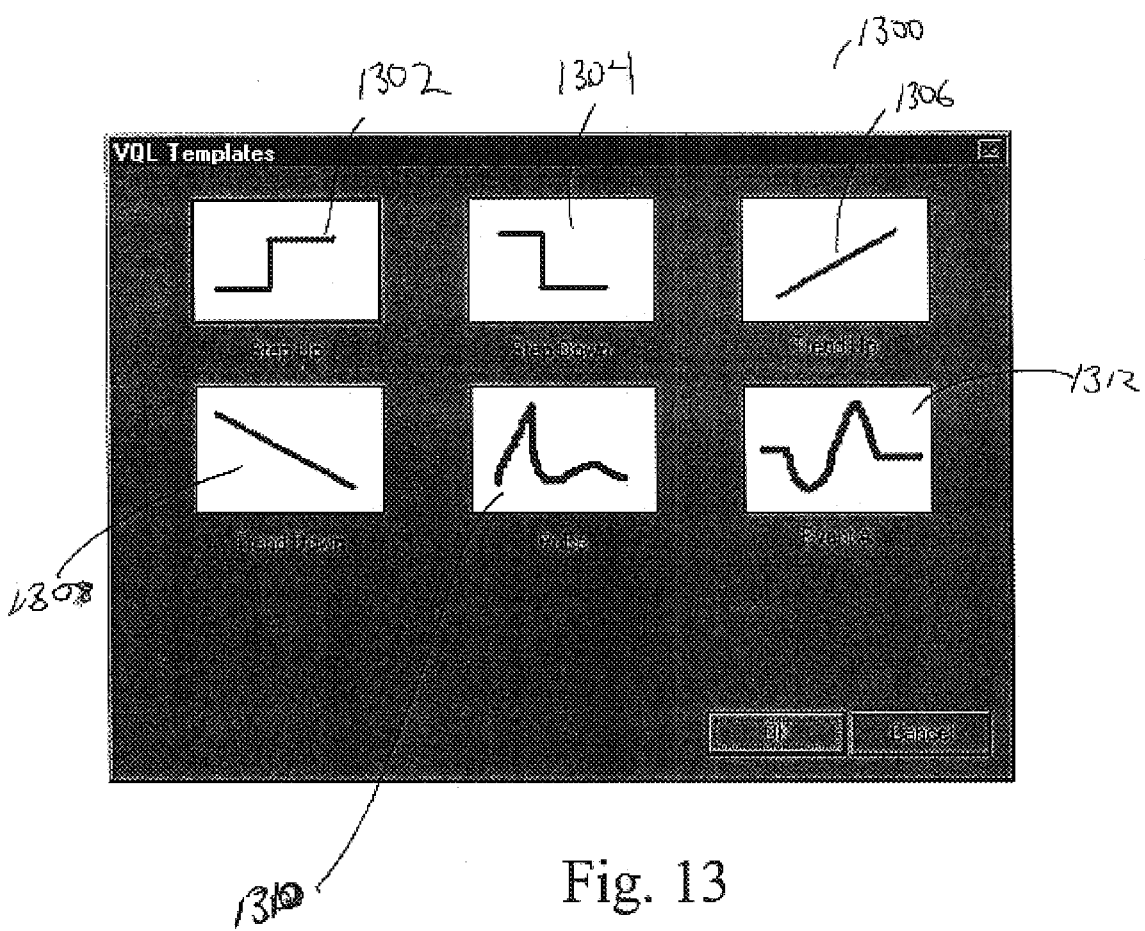
FIG. 13 depicts an example dialog box for defining a search target by selecting a data pattern template from a palette of templates.

After the user selects the process variable or variables, flow proceeds to a block 206, at which the user defines one or more target regions of interest, which are usually events. The user can specify events of interest in a number of ways. For example, the user can select a prototype from a predefined palette of trend patterns. FIG. 13 depicts an example dialog box 1300 used for selecting a prototype or exemplar from a palette. This palette includes several predefined trend patterns 1302, 1304, 1306, 1308, and 1310. In addition, one or more user-defined trend patterns 1312 can also be represented in the palette.

Figure 4:
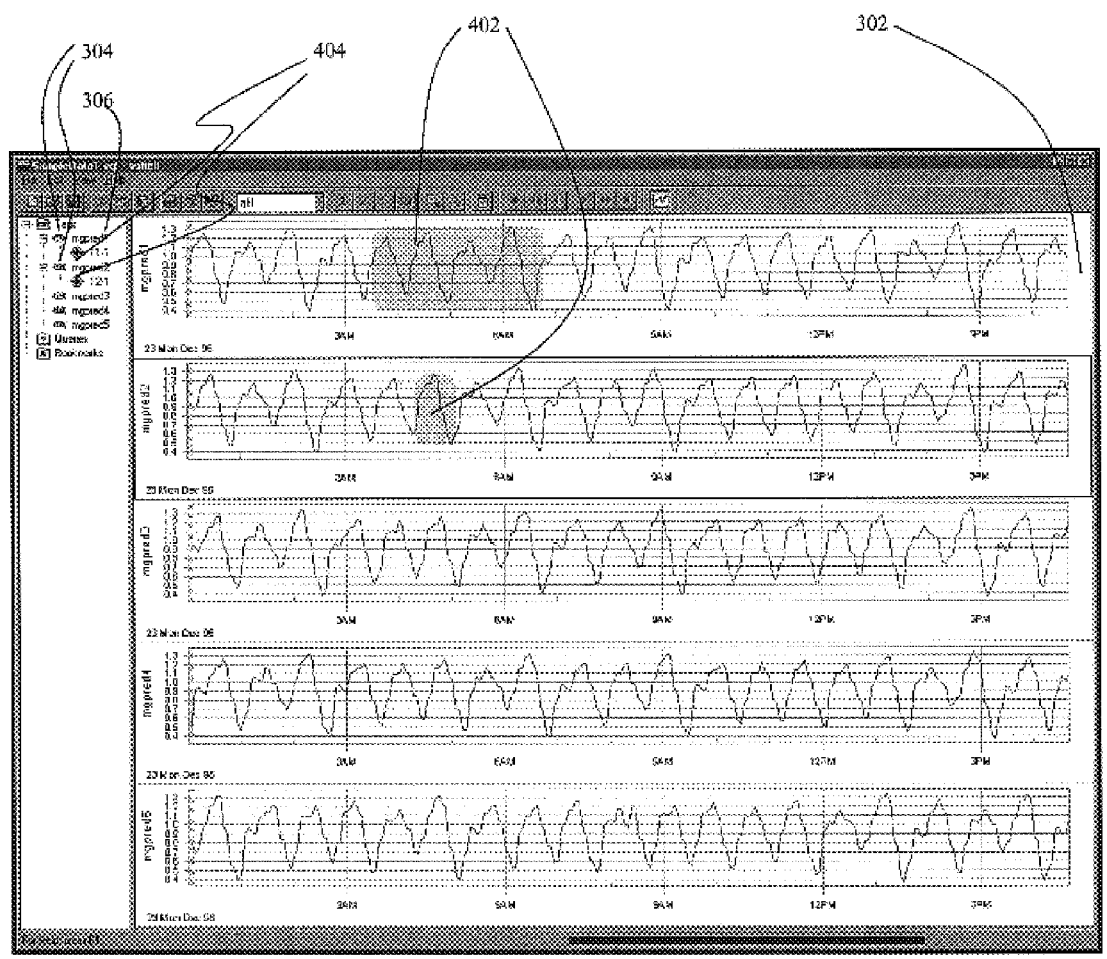
FIG. 4 illustrates the activity of the five process variables represented in FIG. 3, and further illustrates user selection of areas of particular interest in two of the process variables.

If the event is not adequately represented by any of the prototypes in the palette, the user can define the event by, for example, dragging the cursor over the area of interest. FIG. 4 depicts the specification of two events 402 in this manner. As target events are defined in the display area 302, the hierarchical tree structure 306 indicates the defined events as targets 404 in a subordinate relationship with corresponding tags 304.

Figure 12:
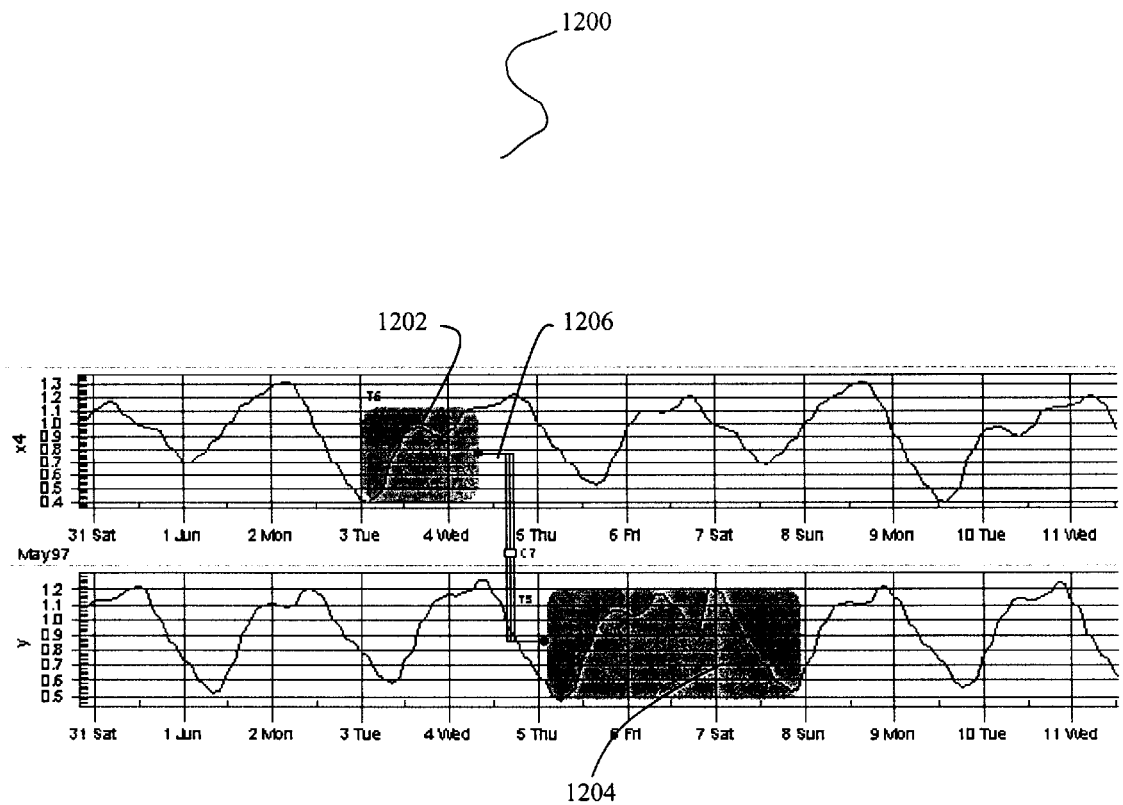
FIG. 12 illustrates user definition of a search target consisting of coincident data patterns in two variables.

According to a particular embodiment, events can be characterized by patterns occurring in multiple process variables. For example, the user can specify that an event consists of a rapid increase in temperature accompanied by a rapid decrease in pressure. This event would be defined by two process variables, temperature and pressure. The user can specify how closely in time these phenomena must occur. FIG. 12 shows an example search target definition 1200 that includes two previously defined simple features 1202 and 1204. A link 1206 connects the simple features 1202 and 1204, indicating that the two simple features 1202 and 1204 must occur together to qualify as a match. In particular, the search target definition 1200 is considered matched by all pairwise matches to the two simple features 1202 and 1204, subject to temporal constraints. In the specific example depicted in FIG. 12, the temporal constraints apply to the time between the end of the simple feature 1202 and the beginning of the simple feature 1204. Temporal constraints can alternatively be defined in terms of the time between the beginnings of both simple features 1202 and 1204 or their ends. In addition, relative time limits, analogous to the compress and expand limits discussed below in connection with FIG. 6, can be defined. Alternatively, temporal constraints can be defined in absolute terms, such as a given number of hours.

It is readily observed that the search target definition 1200 is analogous to a logical AND operation. Multivariable search targets need not be defined conjunctively. They can also be defined disjunctively or negatively, i.e., analogously to a logical OR or NOT operation. These types of target definitions can also be combined into complex queries, e.g., "Feature A and either Feature B or Feature C, but not Feature D." Temporal constraints can be specified for any of these types of target definitions.

Figure 5:
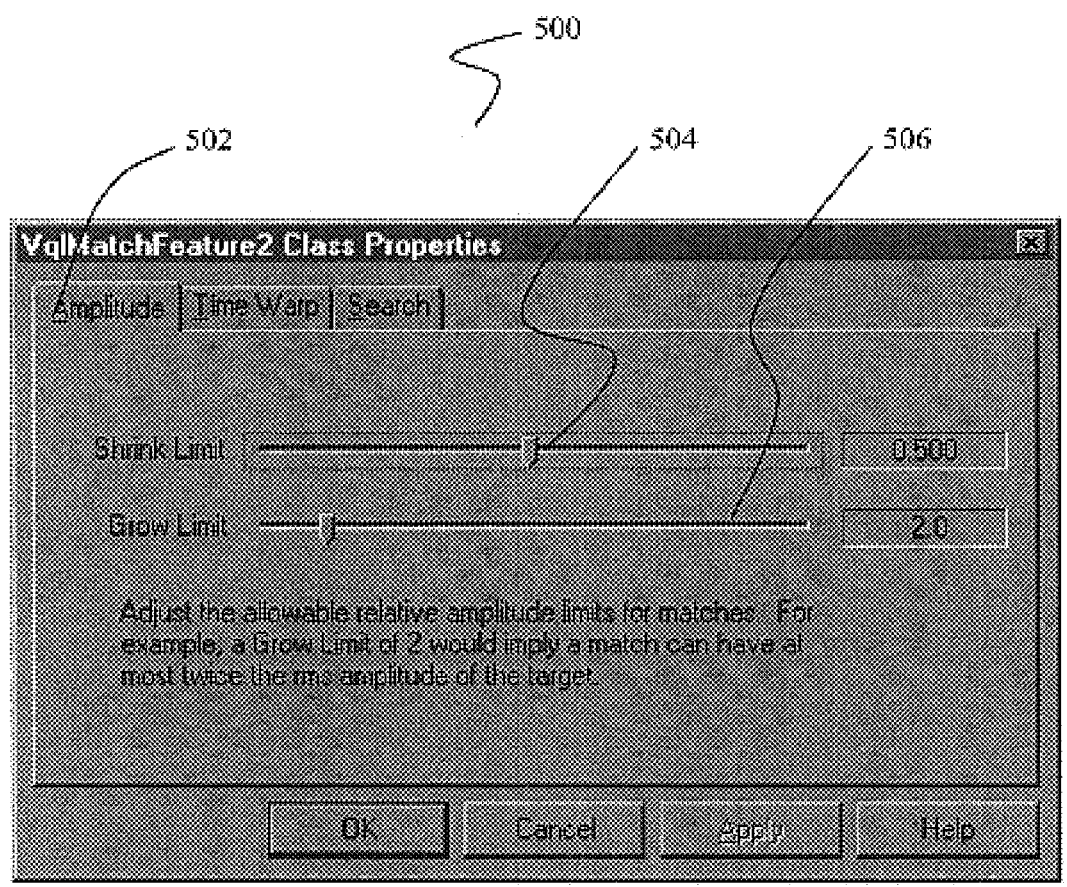
FIGS. 5, 6, and 7 depict a tabbed dialog box for specifying search criteria for finding matches, according to an embodiment of the present invention.
Figure 6:
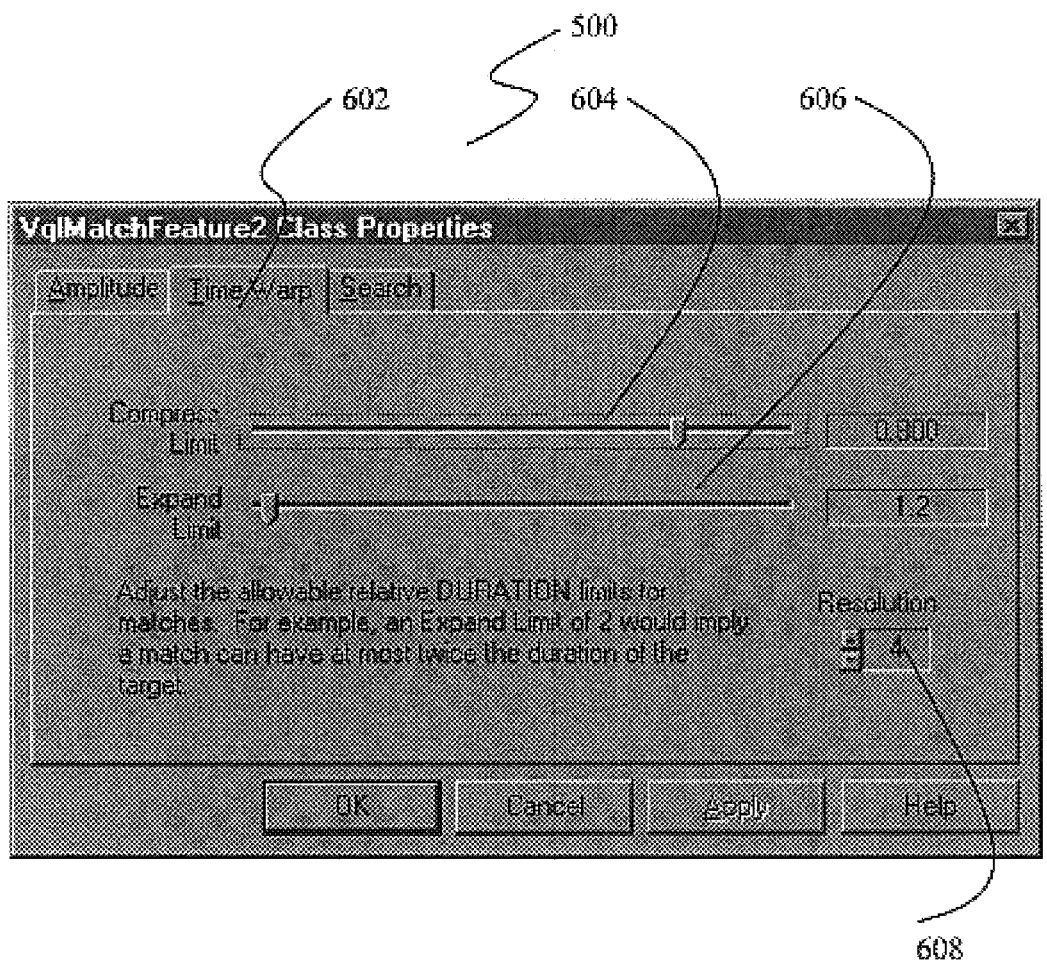
Figure 7:
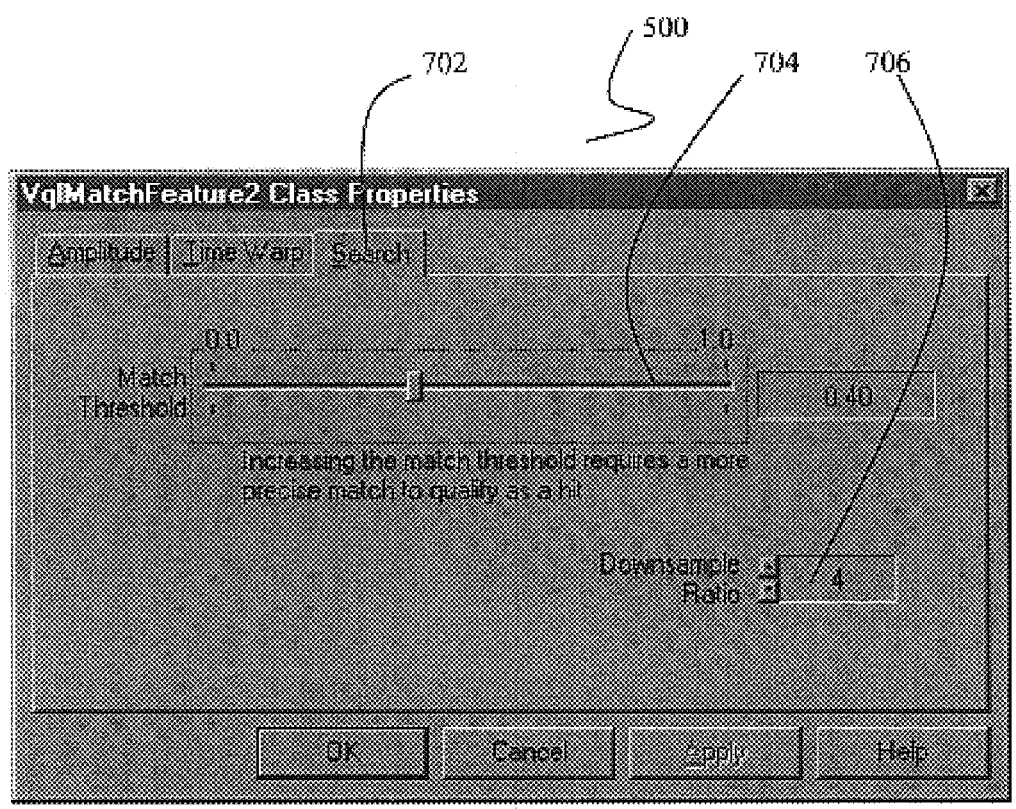

Next, after the target or targets have been defined, the user uses the GUI 300 to search for regions of the data sequence that adequately match the target or targets, as depicted at a block 208. First, the user defines search criteria, such as how well a region of the data sequence must match a target to be considered a "match." FIGS. 5–7 depict an example dialog box 500 for specifying search criteria. In the view illustrated in FIG. 5, an amplitude tab 502 has been selected. Sliders 504 and 506 allow the user to adjust the allowable relative amplitude limits for matches, expressed as shrink and grow limits, respectively. For example, if the user specifies a grow limit of two, a match can have at most twice the root mean squared (RMS) amplitude of the target. Conversely, a shrink limit of two means that a match must have at least half the RMS amplitude of the target.

FIG. 6 depicts the dialog box 500 with a time warp tab 602 selected. Under this tab, sliders 604 and 606 allow the user to adjust the allowable relative duration limits for matches, expressed as compress and expand limits, respectively. A compress limit of two, for example, means that a match must have at least half the duration of the target. Similarly, an expand limit of two means that a match can have up to twice the duration of the target. A resolution control 608 allows the user to specify a degree of compromise between the amount of computational effort spent in the search and the accuracy of the ranking of the results. A high resolution, for example, causes the search algorithm to devote more effort, i.e., more time, to finding matches, but results in a more accurate ranking.

The relative amplitude and duration limits discussed above in connection with FIGS. 5 and 6 can be hard constraints that screen out candidate patterns that might otherwise match the search target, but do not otherwise affect the quality of fit or perceived similarity. Alternatively, these limits may be defined as soft constraints, in which case deviations from the amplitude or duration of the search target do act to penalize the quality of fit.

FIG. 7 depicts the dialog box 500 with a search tab 702 selected. Under this tab, a match threshold slider 704 allows the user to specify a match threshold that describes how well a portion of the data sequence must match the target to qualify as a hit. The match threshold has a value between zero and one. A match threshold of one requires a perfect match, while a match threshold of zero requires no relation at all to the target. The match threshold can also be negative, indicating regions having trends contrary to the target, such as a falling trend where the target contains a rising trend.

A downsample ratio control 706 allows the user to specify a downsample ratio, which determines the factor by which the original sample rate of the data sequence is reduced. For example, considering a trend that evolves over three days in a data sequence sampled at one minute intervals, the three days would contain 4320 one-minute samples. It is generally wasteful to consider all of these samples. Thus, the user can specify a downsample ratio of, for example, sixty to resample the signal to a less frequent, but still effective rate, such as hourly samples. Generally, the downsample ratio is automatically set by the system and does not require user intervention.

Thus, using the dialog boxes discussed above in connection FIGS. 5–7, the user can define similarity criteria to satisfy the needs of the particular application. These similarity criteria can include constraints with respect to time, amplitude, quality of fit, and other considerations.

After the user specifies the search criteria in connection with block 208, the system searches the data sequence for matches, as depicted in a block 210 of FIG. 2. Any of a variety of pattern recognition algorithms can be used to find the matches. According to one embodiment, the system provides the user with a choice of several such algorithms. These algorithms use the same framework for obtaining data, selecting search options, and presenting results. Internally, however, the algorithms may employ very different techniques for finding matches.

Three example techniques are discussed below. Each technique assumes a target sequence $T=\{t_1, t_2, \ldots, t_k\}$ and a search domain $S=\{s_1, s_2, \ldots, S_k\}$ on which to find matches $M_k=\{k_0, k_1\}$. The matches, which result from the search algorithm, are closed intervals in S that satisfy some similarity criterion $\mu$, which may be dependent on the particular algorithm.

The algorithm also receives as input constraints on the maximum and minimum duration ($D^+$, $D-$) of acceptable matches from the expand and compress limits. Similarly, constraints on the maximum and minimum amplitude ($A^+$, $A-$) of acceptable matches are derived from the growth and shrink limits. These constraints are expressed relative to the target T, e.g., 1.0 would be identical to T, while 2.0 would be twice as long or intense. Optionally, algorithms can offer additional parameters to constrain the search or to specify a tradeoff between thoroughness and speed of searching.

Figure 11:
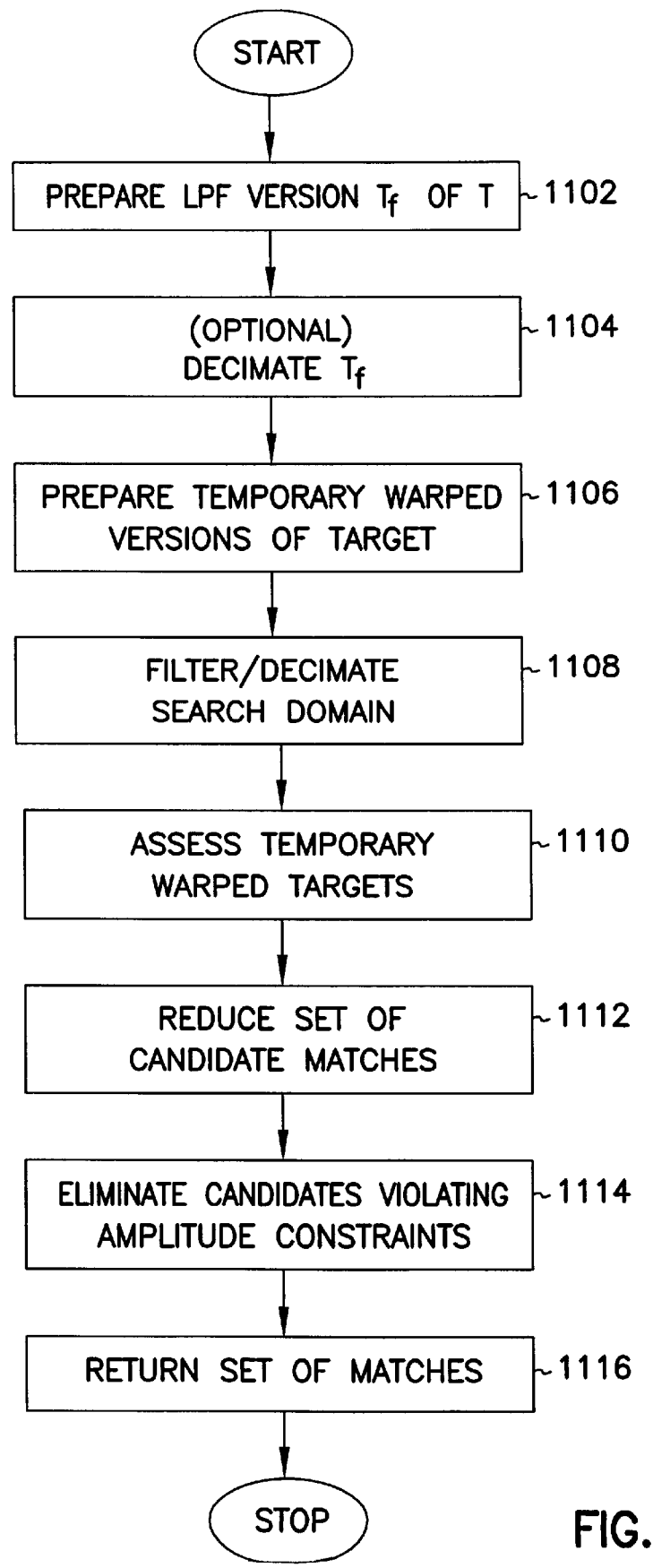
FIG. 11 is a flowchart illustrating one example technique for searching a data sequence for particular patterns of interest, according to still another embodiment of the present invention.

FIG. 11 is a flowchart illustrating one example search technique 1100, known as a match filter technique with warping. First, as depicted at a block 1102, a low pass filtered (LPF) version $T_f$ of the target is prepared. Filtering the target eliminates transients that are irrelevant to the feature of interest. The frequency cutoff of the low pass filter is optionally user selectable, but must satisfy the anti-aliasing requirements for decimation, if needed.

For very long targets or search spaces, the LPF version $T_f$ of the target is decimated by a factor p in order to speed the search, as depicted at a block 1104. Decimation yields a decimated target sequence $T_d=\{t_{d,0}, t_{d,1}, \ldots, t_{d,K}\}$ of length K'=K/p. It should be noted that decimation is not required for shorter targets or search spaces.

Next, as depicted at a block 1106, temporally warped versions of the target T or the decimated target $T_d$ are prepared. These temporally warped versions are denoted as $W_0(T_d), W_1(T_d), \ldots, W_j(T_d)$ using warping operators Wi. In one embodiment, a span of linear expansion and compression operators that cover the range of allowed match duration constraints ($D^+$, $D-$) is used. Alternatively, nonlinear warpings may be used as well.

As illustrated at a block 1108, the search domain S is then filtered and/or decimated in the same manner as the target T, yielding a transformed search domain $S_d$. For relatively small search domains, this process may be performed in a single step. For larger search domains, the process may be performed incrementally.

Next, each temporally warped target is assessed in each position I in $S_d$ in a "sliding window" fashion. A correlation coefficient is used to compute the degree of match $R_i$ for each position I. This correlation coefficient is conventionally defined as {SIGMA xy} OVER SQRT {SIGMA x^2 where the "x" terms are the standardized target, with SIGMA y^2} a mean of zero and a variance of one, and the "y" terms represent the standardized potential match region. This coefficient loosely represents the covariance of the two sequences, normalized by their individual standard deviations.

This measure is not sensitive to differences in amplitude between the target and the potential match. The computation of $R_i$ can be performed in an efficient incremental manner as part of a sequence $\{R_0, R_1, \ldots\}$. A block 1110 depicts this process.

The collection of all positions I such that $\{i:R_i>\mu\}$ contains candidate matches. At a block 1112, this candidate set is reduced by rejecting positions having substantial overlap on any position j with a higher $R_j$. The candidate set is further reduced, at a block 1114, by eliminating candidates that violate amplitude constraints ($A^+$, $A-$). Finally, at a block 1116, this reduced set of candidates is returned as the set of matches M.

Other search techniques can be used instead of the one discussed in connection with FIG. 11. For instance, an alternative technique known as a spline match filter technique is performed substantially similarly to the technique of FIG. 11. In the spline match filter technique, however, low pass filtering is not performed. Instead, the target T is partitioned by any apparent discontinuities, such as jumps or inflection points. Each continuous segment is then replaced by the best fitting low order polynomial spline. This replacement process provides an idealized version of the target for use in the subsequent search steps.

Still another search technique uses a conventional transformation technique generically known as qualitative trend analysis (QTA). In QTA, the original target and search domain are decomposed into strings of symbolic trend primitives using a time invariant approach to segmenting the data set. Any of a variety of conventional segmentation techniques can be used, such as wavelet decomposition. The trend primitives or symbols are invariant to changes in amplitude or duration, though the scale information is retained for later reference. Several trend alphabets are known in the art. One such trend alphabet consists of straight lines and curves formed by combining the straight lines. Once the search domain S and the target T have been reduced to strings on a reduced alphabet, the search process becomes one of string matching, for which various efficient algorithms are known in the art. The number of places in agreement can be used as a measure of accuracy. After a set of candidates has been determined in this manner, this set is reduced by applying the amplitude and duration constraints to the retained scale information. It will be appreciated by those skilled in the art that search techniques other than those discussed herein can be used to find matches in the data sequence.

After the search algorithm has found portions of the data sequence adequately matching the target, the matches are presented to the user in the display area 302, as depicted at a block 212 of FIG. 2. In addition, the search results can be exported to other applications for further analysis. For example, the data can be exported to a general purpose tool that calculates frequency content in the data corresponding to the search results.

Figure 8:
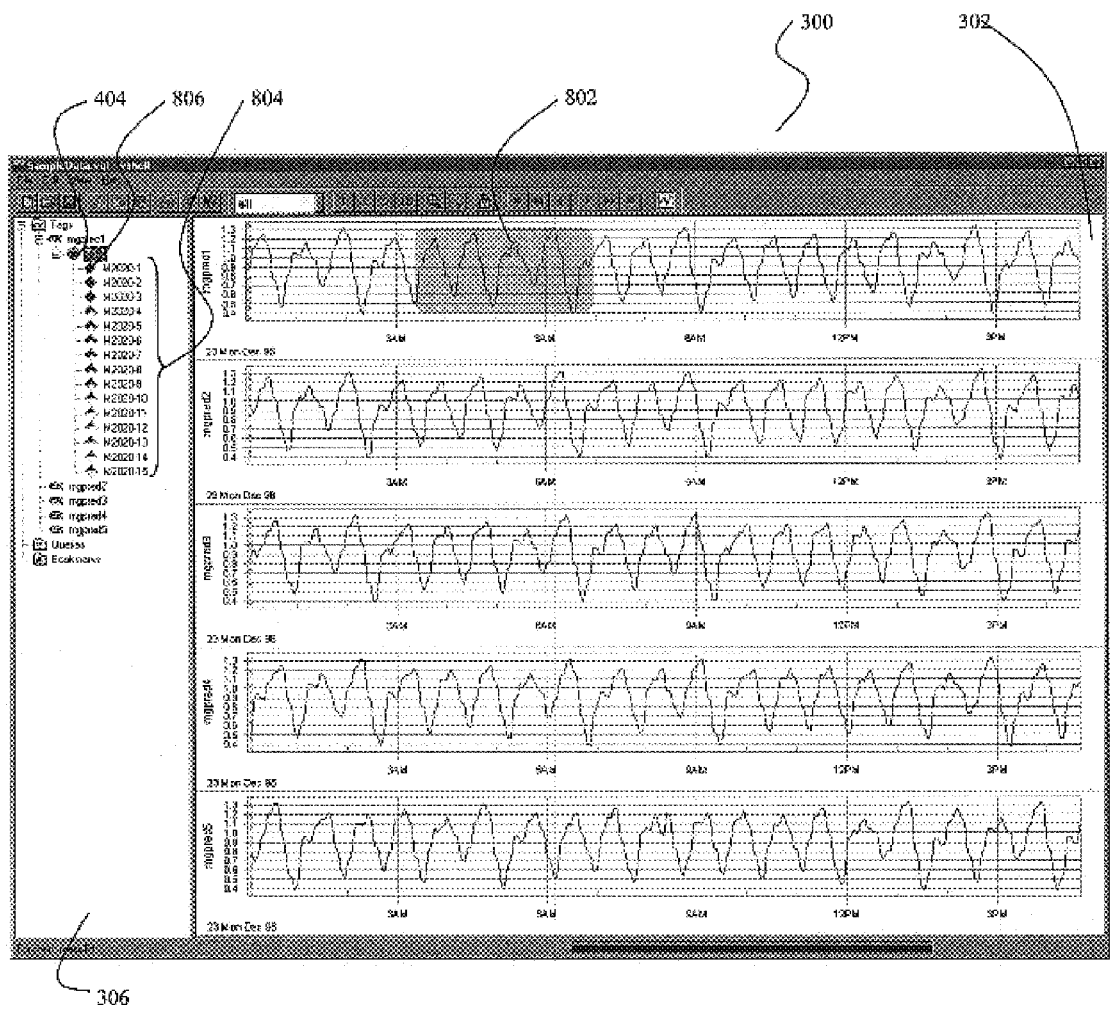
FIG. 8 illustrates a set of found matches, according to an operational example of an embodiment of the present invention.

FIG. 8 illustrates the GUI 300 as it appears after matches for target T1-1, indicated by a shaded portion 802, have been found. The matches are indicated by match labels 804 in a subordinate relationship to the appropriate target 404 in the hierarchical tree structure 306. The match labels 804 are sorted in order of how well the corresponding matches fit the target event. Icons 806 associated with the match labels 804 indicate the match quality. In the particular implementation shown in FIG. 8, a fully shaded diamond indicates a very good fit. Partially shaded diamonds indicate somewhat looser fits.

Figure 9:
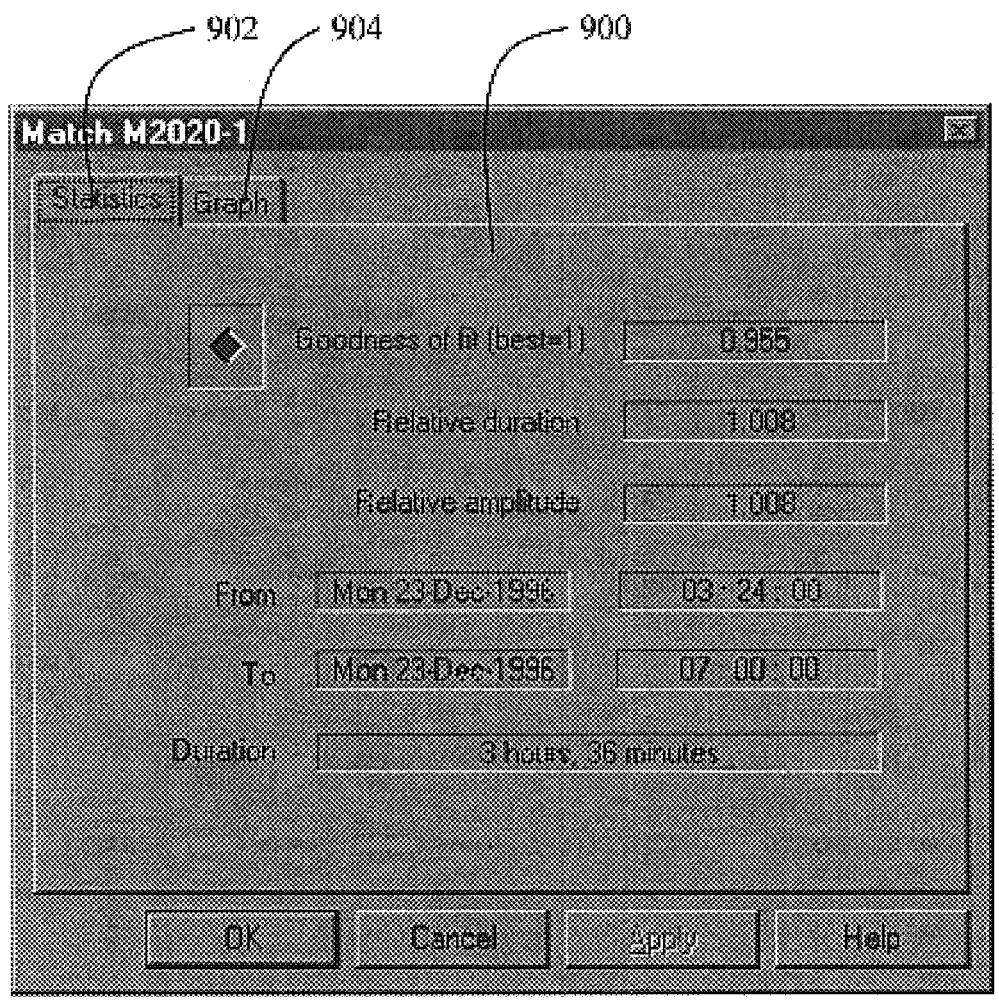
FIGS. 9 and 10 depict a tabbed dialog box for inspecting a particular found match, according to another particular embodiment of the present invention.
Figure 10:
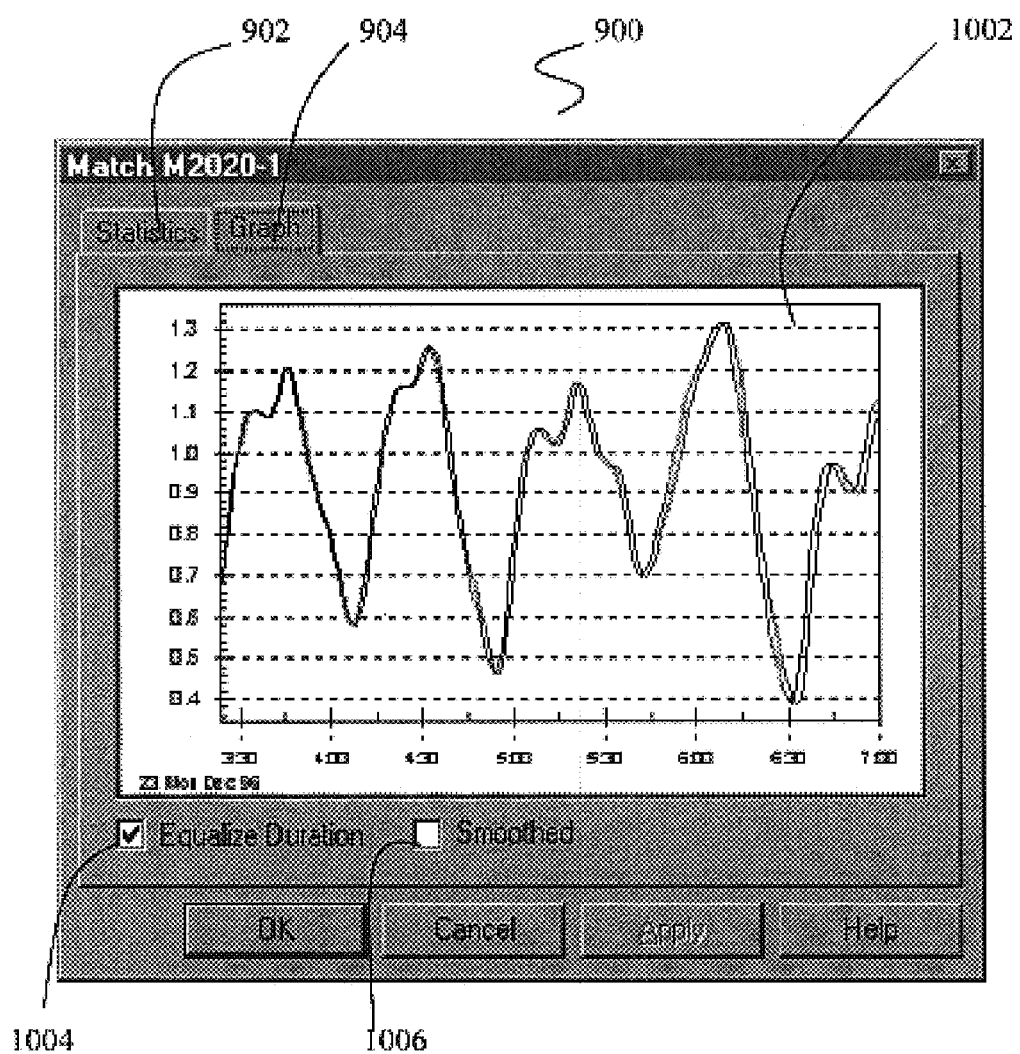

By clicking on an icon 806, the user can visit a particular match. The view in the display area 302 jumps to the portion of the data sequence containing the match. In addition, a dialog box 900, depicted in FIGS. 9 and 10, is invoked. The dialog box 900 has two tabs: a statistics tab 902 and a graph tab 904. Selecting the statistics tab 902 causes the view of FIG. 9 to be displayed. This view contains certain statistics relating to the match. For example, in the particular implementation depicted in FIG. 9, the quality of fit is displayed, as are the relative duration and amplitude of the match, expressed as a proportion of the target's duration and amplitude. The range of the match within the data sequence and the total duration of the match are also indicated.

Selecting the graph tab 904, on the other hand, causes the view of FIG. 10 to be displayed. In this view, the user can see the match and the target plotted on a single graph 1002. Thus, the user can visually compare the match and the target. A check box 1004, when checked, causes the duration of the match to be scaled to the duration of the target in the graph 1002. Checking a check box 1006 causes the plots of the match and the target to be smoothed.

After the user has inspected the matches to his or her satisfaction, the user can query the system again to conduct another search, as indicated by decision block 214 of FIG. 2. If the user decides to conduct another search, flow returns to the block 206, and the user formulates another search.

Alternatively, the user can refine the search. For example, the user can restrict the results to time segments that are longer than a specified limit or specify a new visual feature to be searched upon only in the search results. This refined search then operates on the initial search results, rather than the entire data sequence.

Using a visually-oriented approach to analyzing data sequences allows the user to specify events of interest intuitively and without needing to know traditional query languages. In addition, the user can confidently avoid reviewing large amounts of data not relevant to the current query, instead viewing regions of interest quickly and easily.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A method for finding, within a data sequence, matching sequential data patterns that satisfy a similarity criterion with respect to a sequential target data pattern, the method comprising: displaying a graphical representation of at least a portion of the data sequence using a graphical user interface; defining the sequential target data pattern within the data sequence and the similarity criterion using the graphical user interface, wherein the target data pattern is defined as a combination of individual patterns occurring in a plurality of series variables; applying a pattern recognition algorithm to the data sequence to find the matching sequential data patterns that satisfy the similarity criterion with respect to the sequential target data pattern; and defining a parameter that specifies how closely in time the plurality of patterns in the plurality of series variables must occur to satisfy the similarity criterion for a particular candidate data pattern.

2. A method for finding, within a data sequence, matching sequential data patterns that satisfy a similarity criterion with respect to a sequential target data pattern, the method comprising:

displaying a graphical representation of at least a portion of the data sequence using a graphical user interface;

defining the target data pattern within the data sequence and the similarity criterion using the graphical user interface;

preparing a plurality of temporally warped versions of at least a portion of the target data pattern;

comparing at least one of the temporally warped versions to at least a portion of the data sequence to determine a plurality of candidate data patterns within the data sequence that satisfy a match threshold with respect to the compared at least one temporally warped version; and rejecting candidate data patterns that violate amplitude limits.

3. A method, according to claim 2, further comprising eliminating transients from at least one of the target data pattern and the data sequence.

4. A method, according to claim 2, further comprising decimating at least one of the target data pattern and the data sequence.

5. A method, according to claim 2, further comprising partitioning the target data pattern by at least one apparent discontinuity.

6. A computer-readable medium having computer executable instructions for: displaying a graphical representation of at least a portion of a data sequence using a graphical user interface; defining a sequential target data pattern within the data sequence and a similarity criterion using the graphical user interface, wherein the target data pattern is defined as a combination of individual patterns occurring in a plurality of series variables; and applying a pattern recognition algorithm to the data sequence to find matching sequential data patterns within the data sequence that satisfy the similarity criterion with respect to the target data pattern; and defining a parameter that specifies how closely in time the plurality of patterns in the plurality of series variables must occur to satisfy the similarity criterion for a particular candidate data pattern.

7. A computer-readable medium having computer-executable instructions for:

displaying a graphical representation of at least a portion of the data sequence using a graphical user interface;

defining a sequential target data pattern within the data sequence and a similarity criterion using the graphical user interface;

preparing a plurality of temporally warped versions of at least a portion of the target data pattern;

comparing at least one of the temporally warped versions to at least a portion of the data sequence to determine a plurality of candidate data patterns within the data sequence that satisfy a match threshold with respect to the compared at least one temporally warped version; and rejecting candidate data patterns that violate amplitude limits.

8. A computer-readable medium, according to claim 7, having further computer-executable instructions for eliminating transients from at least one of the target data pattern and the data sequence.

9. A computer-readable medium, according to claim 7, having further computer-executable instructions for decimating at least one of the target data pattern and the data sequence.

10. A computer-readable medium, according to claim 7, having further computer-executable instructions for partitioning the target data pattern by at least one apparent discontinuity.

11. For use in finding, within a data sequence, matching sequential data patterns that satisfy a similarity criterion with respect to a sequential target data pattern, a computer arrangement, configured to: display a graphical representation of at least a portion of a data sequence using a graphical user interface; define the target data pattern within the data sequence and a similarity criterion using the graphical user interface, wherein the target data pattern is defined as a combination of individual patterns occurring in a plurality of series variables; apply a pattern recognition algorithm to the data sequence to find matching data patterns within the data sequence that satisfy the similarity criterion with respect to the target data pattern; and define a parameter that specifies how closely in time the plurality of patterns in the plurality of series variables must occur to satisfy the similarity criterion for a particular candidate data pattern.

12. For use in finding, within a data sequence, matching sequential data patterns that satisfy a similarity criterion with respect to a sequential target data pattern, a computer arrangement configured to:

display a graphical representation of at least a portion of the data sequence using a graphical user interface;

define the target data pattern within the data sequence and a similarity criterion using the graphical user interface;

prepare a plurality of temporally warped versions of at least a portion of the target data pattern;

compare at least one of the temporally warped versions to at least a portion of the data sequence to determine a plurality of candidate data patterns within the data sequence that satisfy a match threshold with respect to the compared at least one temporally warped version; and reject candidate data patterns that violate amplitude limits.

13. A computer arrangement, according to claim 12, further configured to eliminate transients from at least one of the target data pattern and the data sequence.

14. A computer arrangement, according to claim 12, further configured to decimate at least one of the target data pattern and the data sequence.

15. A computer arrangement, according to claim 12, further configured to partition the target data pattern by at least one apparent discontinuity.

* * * * *